United States Patent [19]

Schoenbeck

[11] Patent Number: 5,093,206

[45] Date of Patent: Mar. 3, 1992

[54] CURABLE LAMINATED ARTICLE OF EPDM ELASTOMER AND ETHYLENE-CONTAINING POLYMER

[75] Inventor: Melvin A. Schoenbeck, Wilmington, Del.

[73] Assignee: E. I. Du Pont de Nemours and Company, Wilmington, Del.

[21] Appl. No.: 490,923

[22] Filed: Mar. 9, 1990

[51] Int. Cl.$^5$ .............................................. B32B 27/32
[52] U.S. Cl. .................................... 428/521; 428/141; 428/500; 525/222
[58] Field of Search ....................... 428/521, 500, 141; 525/222

[56] References Cited

U.S. PATENT DOCUMENTS

| | | | |
|---|---|---|---|
| 2,611,721 | 6/1949 | Brees | 154/8 |
| 3,372,078 | 5/1968 | Fausti et al. | 156/306 |
| 3,834,932 | 9/1974 | Brandl | 117/47 |
| 4,666,785 | 5/1987 | Crepeau | 428/521 |

FOREIGN PATENT DOCUMENTS 2350  1/1982  Japan ............................ 525/222

Primary Examiner—Edith L. Buffalow
Attorney, Agent, or Firm—Craig H. Evans

[57] ABSTRACT

A curable laminated article, useful for roofing application, comprising at least two layers, each layer comprising a blend of (a) 50–80% by weight of an ethylene/propylene/nonconjugated diene elastomer and (b) 20–50% by weight of an ethylene-containing polymer selected from the group consisting of polyethylene, an ethylene alpha-monoolefin copolymer wherein the monoolefin contains from 3–12 carbon atoms and is present in amounts of 2–8% by weight, and as ethylene/vinyl acetate copolymer having a vinyl acetate content up to about 10% by weight, and wherein each alternate layer contains either elemental sulfur as the crosslinking agent for the elastomer or a cure accelerator so that the elastomer in the laminated article subsequently cures when elemental sulfur and the accelerator in each layer migrate to an adjacent layer when the laminate is exposed to elevated temperatures.

16 Claims, No Drawings

CURABLE LAMINATED ARTICLE OF EPDM ELASTOMER AND ETHYLENE-CONTAINING POLYMER

BACKGROUND OF THE INVENTION

This invention relates to sheeting or membrane materials based on blends of ethylene/propylene/nonconjugated diene elastomers (EPDM) and ethylene-containing polymers which combine the properties of durability and seamability and are useful for covering roofs of building structures.

Thermoset EPDM elastomer compositions are very weather-resistant and they are used extensively as roofing membranes. However, the adhesive systems required to bond connecting sheets of the thermoset roofing provide only marginally adequate bond strength and they add significantly to the installation cost of the roofing membranes because of the labor required. The establishment of strong water-tight seams between adjacent sheets of roofing material is, of course, extremely important in such applications. The seams of the connecting sheets are often subjected to high winds, heavy rains, and snow and ice storms and they must be capable of withstanding the stresses generated by such adverse weather conditions. In addition, the seams of the connecting sheets used on flat roofs are further subjected to additional stress from the pooling of water, which often goes through alternating cycles of freezing and thawing. Finally, foot traffic across the roof covered with sheets of thermoset EPDM elastomers also contributes to considerable stress on the seams over the lifetime of the roofing membrane which may exceed 20 years.

Alternatively, thermoplastic EPDM compositions have been proposed for roofing membranes because they can be seamed rapidly by the application of heat and pressure. However, these compositions have not been used successfully because they soften excessively when exposed to direct sunlight during the warm weather months and thus require careful handling during installation and because they lack the toughness of cured sheets. Improving the hot strength of thermoplastic EPDM by blending it with other higher melting polymeric materials is only a partial solution to these problems. Although the hot strength of the blend is adequate for installation of the roofing membrane, the possibility of damage from foot traffic still exists each summer during hot weather.

Thus there is a need in the roofing membrane industry for a durable, heat seamable composition that does not require the application of adhesives containing organic solvent to the edges of the film or membrane to bond or seal the films together and also provides membranes having adequate strength for installation and resistance to damage from foot traffic.

SUMMARY OF THE INVENTION

The present invention is directed to a laminated article, especially useful for roofing applications, which comprises at least two layers, each layer comprising a blend of (a) 50–80% by weight, preferably 60–75% weight percent, of an ethylene/propylene/non-conjugated diene elastomer and (b) 20–50% by weight, preferably 25–40% by weight, of an ethylene-containing polymer selected from the group consisting of polyethylene, ethylene alpha-monoolefin copolymers wherein the alpha-monoolefin contains 3–12 carbon atoms and is present in an amount of about 2–8% by weight and ethylene/vinyl acetate copolymers having vinyl acetate contents up to about 10% by weight, and wherein each alternate layer contains either elemental sulfur as the crosslinking agent for the elastomer or a cure accelerator so that the elastomer in the laminated article subsequently cures when elemental sulfur and the accelerator in each layer migrate to an adjacent layer when the laminate is exposed to elevated temperatures.

The EPDM elastomer can contain from 50–75 percent by weight ethylene, and preferably the elastomer contains from about 65–72% by weight ethylene. Preferably, the EPDM is a terpolymer of ethylene, propylene, and 1,4-hexadiene or ethylidene norbornene. Another preferred EPDM elastomer is a tetrapolymer of ethylene, propylene, 1,4-hexadiene and norbornadiene. To increase the rate and level of cure zinc oxide is usually present in at least one layer, preferably in all layers.

DETAILED DESCRIPTION OF PREFERRED EMBODIMENTS

The curable laminated article of the present invention has two or more layers wherein one layer(s) contains elemental sulfur and the adjacent layer(s) contains the accelerator. Each layer contains a blend of the EPDM elastomer and an ethylene-containing polymer. The layered or laminated structure and the composition of the polymer blend provide the strength necessary for the laminate to be used, especially as a roofing membrane. The curative system, that is, the elemental sulfur crosslinking agent and the accelerator, slowly migrates between the layers when the laminate is exposed to elevated temperature, for example, temperatures exceeding 70° C. for about 30 days and thereby forms a cured, tough durable membrane. When the curable laminate is installed on a roof, and ambient temperatures are of the order of 20°–25° C. and temperatures on a roof covered by the laminated article reach about 70°–80° C. for at least several hours per day, the laminate cures in about 40–60 days. During installation of the laminated roofing membrane, the membranes containing two or more layers are joined together by simply heat seaming in a conventional manner the edges of adjoining sheets.

Each of the layers of the curable laminated article comprises a blend of EPDM elastomer and an ethylene-containing polymer. The EPDM that is present in the blend in amounts of from 50–80% by weight, preferably 60–75% by weight, can be any ethylene/propylene/diene terpolymer or tetrapolymer elastomer of the EPDM type. EPDM elastomers are copolymers of ethylene and propylene and a nonconjugated diene having one reactive double bond. They may, in addition, contain a minor amount of a second diene, which may have two reactive double bonds. The non-conjugated dienes of the first type include 1,4-hexadiene; 2-methyl-1,5 hexadiene; 1,9-octadecadiene; dicyclopentadiene; tricyclopentadiene; 5-ethylidene-2-norbornene; or 5-methylene-2-norbornene. Preferred dienes having one reactive double bond are 1,4-hexadiene and ethylidene norbornene. The non-conjugated dienes of the second type include norbornadiene; 1,4-pentadiene; 1,5-hexadiene; 1,7-octadiene; 1,20-heneicosadiene; or 5-(5-hexenyl)-2-norbornene, preferably norbornadiene. The EPDM elastomers which are suitable for use in the laminated articles of this invention contain about 50–75 weight percent of ethylene, preferably 65–72%, and 1–6 weight percent of a diene or combination of dienes, the remainder being substantially propylene. The preferred EPDM elastomers are those which are highly crystalline and have ethylene contents of at least 65% by weight because such elastomers provide improved strength to the blended compositions while they are still uncured.

The polymer blend forming a single layer of the resulting laminate also contains from 20-50% by weight, preferably 25-40% by weight, of a second ethylene-containing polymer selected from the group consisting of (a) polyethylene, (b) ethylene/alpha-monoolefin copolymers wherein the alpha-monoolefin contains 3-12 carbon atoms, preferably 4-8 carbon atoms, and is present in an amount of from about 2-8% by weight and (c) ethylene/vinyl acetate copolymers containing up to 10% by weight vinyl acetate, usually 3-9% by weight. The polyethylene used in the blend can be any type, that is, high, low, or medium density polyethylene. Preferably, the polyethylene used has a density of from 0.92-0.94 g/cc. Representative ethylene/alpha-monoolefin copolymers include ethylene/propylene, ethylene/butene, ethylene/hexene, ethylene octene, and ethylene heptene. Ethylene/butene is preferred. The addition of the ethylene-containing polymers that are compatible with and incorporated in the EPDM elastomer raises the modulus of the elastomer and hence the strength of the elastomer. Usually, the uncured laminated membranes have a modulus at 50% elongation of at least 1.4 MPa (200 psi) when measured in the transverse direction at 70° C.

It is an important feature of the invention that the curative and accelerator portions of the crosslinking system be present in alternate layers. Thus, elemental sulfur is present in one layer(s) and the accelerator is present in the adjacent layer(s). Accordingly, during compounding of the elastomer blend used for each layer, either sulfur or accelerator is present.

Separation of the curing system precludes scorching of the composition during the compounding and calendering processes and, consequently, subsequent seamability is not adversely affected. When the laminates are installed on a roof, the adjacent laminates are easily heat-sealed at their edges and the entire laminated membrane slowly cures in place by diffusion of the elemental sulfur and accelerator into adjacent layers with subsequent curing as a result of elevated temperatures.

The elastomer compositions which are used to form the curative-containing layer(s) have incorporated therein about 0.5-2 parts elemental sulfur per 100 parts total polymer.

Accelerators are incorporated into the elastomer blend compositions used to form the alternate layer(s) of the laminate in amounts of from about 1-4 parts accelerator per 100 parts total polymer. Conventional accelerators that are used in curing systems for EPDM elastomers can be used. Representative accelerators include salts of dialkyldithiocarbamates such as zinc dibutyldithiocarbamate, zinc dimethyldithiocarbamate, zinc diethyldithiocarbamate, bismuth dibutyldithiocarbamate, copper dimethyldithiocarbamate, selenium diethyldithiocarbamate, lead dimethyldithiocarbamate, tellurium diethyldithiocarbamate, cadmium diethyldithiocarbamate and thiuram monosulfides such as tetramethylthiuram monosulfide and tetrabutylthiuram monosulfide.

The blend of EPDM elastomer and ethylene-containing polymer containing accelerator can contain, and preferably does contain, a vulcanization promoter that assists in further accelerating the cure of the EPDM elastomer when the accelerator and elemental sulfur migrate to a layer but which does not itself result in cure of the EPDM elastomer. Indeed, the action of these vulcanization promoters is so weak that they can be incorporated in the blend of EPDM elastomer and ethylene-containing polymer that contains elemental sulfur and scorching will not occur if processing temperatures do not exceed 130° C. These vulcanization promoters include benzothiazoles such as 2-mercaptobenzothiazole, benzothiazyl disulfide, and 2-mercaptothiazoline. These vulcanization promoters can be incorporated in the polymer blend in amounts of from about 0.5-3 parts per 100 parts total polymer.

Metal oxides are usually present in the curative system. Representative metal oxides include zinc oxide, lead oxide, bismuth oxide, cadmium oxide and calcium oxide. Zinc oxide is almost always the metal oxide of choice because of its effectiveness and lack of toxicity. Usually such metal oxides are added to the polymer composition in amounts of from 2 to 10 parts/100 parts total polymer. Many accelerators and vulcanization promoters react with zinc oxide to form salts of even greater vulcanization activity. Zinc oxide itself acts as a vulcanization promoter, speeding the rate of reaction of elemental sulfur with the unsaturated cure sites in the EPDM elastomer.

Other ingredients such as low volatility paraffinic or naphthenic processing oils, such as Sunpar 2280 and Shellflex 790 can be incorporated in the blend in amounts usually from 10-60 parts per 100 parts total polymer. Fillers such as carbon black and mineral fillers can be incorporated in the polymer blend in amounts usually from 50-200 parts per 100 parts total polymer.

In order to form the laminates of the present invention the compounded material containing elemental sulfur as the curative and the compounded material containing the accelerator are formed into a multi-layered sheet. This can be accomplished either by first forming one of the sheets on a calendar, and subsequently calendering the second sheet directly onto the first sheet. Calendar roll temperatures between about 120°-160° C. are used to calendar these sheets. Alternatively, when a four-roll calendar is used, a two-layer laminate can be formed by adding one of the blend compositions directly to the feed nip between rolls one and two, and the other blend composition is added to the feed nip between rolls three and four. By directing the sheet from rolls one and two around roll two, and the sheet from rolls three and four around roll three, the two sheets can be laminated together as they are pressed together between rolls two and three.

Generally, the laminates contain two or three layers but can contain of the order of five. When forming the laminate the layers containing sulfur curative and those containing accelerator are placed in alternate plies. The thickness of an individual layer is from about 0.13-1.3 mm, and preferably 0.25-1.0 mm and the thickness of the multi-layered structure can be from about 0.5-4.0 mm, preferably 1.0-2.0 mm.

The Mooney scorch value for each layer of the uncured laminate usually is at least about 30 minutes to a 10 point rise measured at 150° C. using ASTM D-1646, small rotor. Also, usually the cure rate of the laminate itself is such that it has a tensile strength at 70° C. of at least about 2.5 MPa and a modulus at 50% elongation of at least about 2.0 in the transverse direction after exposure in an oven heated to 70° C. for 30 days.

The following examples in which parts are by weight, unless otherwise indicated, further illustrate embodiments of the invention.

POLYMERS

Polymer Composition A 70 parts:
  71% Ethylene/Propylene/3.7% 1,4-Hexadiene/0.9% Norbornadiene
  Inherent viscosity: 2.2
30 parts:
  Ethylene-butene copolymer
  Wt. ratio 94/6, Density 0.924 g/cc
  Melt index: 4.0 dg/min. (ASTM D 1238 Condition 190/2.16)

Polymer Composition B 70 parts:
  71% Ethylene/Propylene/3.7% 1,4-Hexadiene/0.9% Norbornadiene
  Inherent viscosity: 2.2
30 parts:
  Ethylene/vinyl acetate
  Vinyl acetate content 9%
  Melt index 2.0 dg/min. (ASTM D1238 Condition 190/2.16)

Polymer Composition C 70 parts:
  72% Ethylene/Propylene/4.6% Ethylidene norbornene
  Inherent viscosity: 2.3
30 parts:
  Ethylene-butene copolymer
  Wt. ratio 94/6, Density 0.924 g/cc
  Melt index: 4.0 dg/min. (ASTM D 1238, Condition 190/2.16)

Polymer Composition D 60 parts:
  71% Ethylene/Propylene/3.7% 1,4-Hexadiene/0.9% Norbornadiene
  Inherent viscosity: 2.2
40 parts:
  Ethylene-butene copolymer
  Wt. ratio 94/6 Density 0.924 g/cc
  Melt index: 4.0 dg/min. (ASTM D 1238, Condition 190/2.16)

Polymer Composition E 75 parts:
  70% Ethylene/Propylene/3.7% 1,4-Hexadiene/0.14% Norbornadiene
  Inherent viscosity: 2.0
25 parts:
  Polyethylene
  Density 0.920 g/cc
  Melt index: 1.1 dg/min. (ASTM D 1238, Condition 190/2.16)

EXAMPLE 1

An elastomer compound IA was prepared by mixing 100 parts Polymer Composition A, 140 parts carbon black, 30 parts paraffinic petroleum oil (Sunpar 2280), 0.16 parts stearic acid, 3 parts zinc oxide and 1 part elemental sulfur in a Banbury mixer with rotor speed at 80 rpm. The compound was dumped from the mixer when the temperature reached 120°–130° C. Mooney scorch of the compound was measured at 150° C. according to ASTM D-1646 using the small rotor. The minimum was 30 and after 30 minutes there was a 5 point rise.

In a similar manner elastomer composition 1B was prepared by mixing 100 parts Polymer Composition A, 140 parts carbon black, 30 parts paraffinic petroleum oil, 0.1 part stearic acid, 3 parts zinc oxide, 1 part mercaptobenzothiazole and 1 part zinc dibutyldithiocarbamate. The Mooney scorch of the compound was measured as described above and the minimum was 30 and after 30 minutes there was a zero point rise.

A two-layer laminate was produced by first calendering a 0.57 mm thick sheet of elastomer compound 1A between calendar rolls heated to 130° C. and then calendering a 0.57 mm thick sheet of elastomer compound 1B directly onto the first sheet between calendar rolls heated to 130° C. This formed a 1.14 mm thick two layer structure.

Physical properties of the curable laminate were measured at 23° C. and at 70° C. according to ASTM D 412 in both the machine and transverse directions. Results are shown in Table I.

TABLE I

|  | Machine Direction | Transverse Direction |
| --- | --- | --- |
| Properties Measured at 23° C. | | |
| Modulus at 50% Elongation, (MPa) | 6.9 | 5.2 |
| Tensile Strength, (MPa) | 9.9 | 8.5 |
| Elongation at Break, (%) | 290 | 400 |
| Properties Measured at 70° C. | | |
| Modulus at 50% Elongation, (MPa) | 2.1 | 1.4 |
| Tensile Strength, (MPa) | 2.5 | 1.6 |
| Elongation at Break, (%) | 250 | 280 |

The edges of two laminates were seamed together with a mechanically driven hot air seamer with air heated to 490° C. The speed of the seamer was 1.2 m per minute. The peel adhesion was 1.4 kN/m on the uncured sample. After 7 days in a 70° C. oven the peel adhesion was 6.7 kN/m.

Laminate samples prepared as described above were placed in an oven heated to 70° C. The modulus at 50% elongation measured at 70° C. in the transverse direction was determined after the times shown in Table II.

TABLE II

| Modulus at 50% Elongation, (MPa) | |
| --- | --- |
| 0 Days | 1.4 |
| After 30 Days | 2.8 |
| After 60 Days | 3.0 |
| After 90 Days | 3.2 |

A three-layer laminate of elastomer composition 1A and 1B, described above, was prepared by first calendering (a) 0.57 mm sheet of elastomer composition 1A and then calendering 0.28 mm sheets of elastomer composition 1B on both the top and bottom of the elastomer composition 1A sheet. The total thickness of the three layer laminate was 1.13 mm. Physical properties of the laminate were measured and the values are given below in Table III. The edges of the laminate were seamed together as described above. The original peel adhesion was 6.0 kN/m and after 7 days at 70° C. the value was 6.6 kN/m.

TABLE III

|  | Machine Direction | Transverse Direction |
|---|---|---|
| Properties Measured at 23° C. | | |
| Modulus at 50% Elongation, (MPa) | 8.5 | 5.7 |
| Tensile Strength, (MPa) | 9.9 | 8.2 |
| Elongation at Break, (%) | 290 | 420 |
| Properties Measured at 70° C. | | |
| Modulus at 59% Elongation, (MPa) | 2.6 | 1.9 |
| Tensile Strength, (MPa) | 3.5 | 2.3 |
| Elongation at Break, (%) | 165 | 270 |

Samples of the three-layer laminate were cured following the same procedure described above for the two-layer laminate. The modulus at 50% elongation measured at 70° C. in the transverse direction is shown in Table IV.

TABLE IV

| Modulus at 50% elongation (MPa) | |
|---|---|
| 0 Days | 1.9 |
| After 14 Days | 2.5 |
| After 30 Days | 2.9 |
| After 60 Days | 2.8 |
| After 90 Days | 3.1 |

From the above it can be seen that the curable laminate has adequate strength for installation as roofing and that it is strong enough to withstand foot traffic even in its uncured state. Also, data indicate that it forms strong heat weldable seams. Further, the laminate achieved about 80% of its cure at 70° C. within 30 days.

EXAMPLE 2

An elastomer compound 2 was prepared using the procedure described in Example 1 and containing 100 parts Polymer Composition A, 140 parts carbon black, 30 parts paraffinic petroleum oil, 0.1 parts stearic acid, 3 parts zinc oxide and 1.6 parts zinc dimethyldithiocarbamate. The Mooney scorch at 150° C. was measured. The minimum was 30 and after 30 minutes there was a zero point rise.

A two layer laminate was produced using the calendar procedure described above in Example 1 by calendering a 0.57 mm thick sheet of elastomer compound 1A of Example 1 and 0.57 mm thick sheet of elastomer compound 2.

Physical properties of the curable laminate were measured at 23° C. and at 70° C., according to ASTM D412 in both machine and transverse directions. Results are shown in Table V.

TABLE V

|  | Machine Direction | Transverse Direction |
|---|---|---|
| Properties Measured at 23° C. | | |
| Modulus at 50% Elongation, (MPa) | 6.0 | .5.2 |
| Tensile Strength, (MPa) | 9.6 | 8.3 |
| Elongation at Break, (%) | 290 | 390 |
| Properties Measured at 70° C. | | |
| Modulus at 50% | 2.5 | 2.1 |
| Tensile Strength, (MPa) | 3.2 | 2.4 |
| Elongation at Break, (%) | 200 | 265 |

Laminate samples prepared as described above were placed in an oven heated to 70° C. The modulus at 50% elongation measured at 70° C. in the transverse direction was determined after the time shown in Table VI.

TABLE VI

| Modulus at 50% Elongation, (MPa) | |
|---|---|
| 0 Days | 2.1 |
| After 14 Days | 2.8 |
| After 30 Days | 2.7 |
| After 60 Days | 2.8 |

EXAMPLE 3

An elastomer compound 3A was prepared using the procedure described above in Example 1 except that the compound was dumped from the mixer when the temperature reached 140°-150° C. The compound contained 100 parts Polymer Composition D, 140 parts carbon black, 30 parts paraffinic petroleum oil, 0.16 parts stearic acid, 3 parts zinc oxide, 1 part elemental sulfur and 0.3 parts mercaptobenzothiazole. The Mooney scorch at 150° C. was measured. The minimum was 27 and there was 10 point rise in 30 minutes.

A second elastomer compound 3B was prepared in the same manner described above and contained 100 parts Polymer Composition D, 140 carbon black, 30 parts paraffinic petroleum oil, 0.18 parts stearic acid, 3 parts zinc oxide, 0.7 parts mercaptobenzothiazole and 1 part zinc dibutyldithiocarbamate. The Mooney scorch at 150° C. was measured. The minimum was 24 and there was a zero point rise in 30 minutes.

A two-layer laminate was produced using the procedure described in Example 1 except that the calendar rolls were heated to 135°-145° C. The thickness of each layer was 0.57 mm.

Physical properties of the curable laminate were measured, according to ASTM D412 in both the machine and transverse directions. Results are shown in Table VII.

TABLE VII

|  | Machine Direction | Transverse Direction |
|---|---|---|
| Properties Measured at 23° C. | | |
| Modulus at 50% Elongation, (MPa) | 6.8 | 5.8 |
| Tensile Strength, (MPa) | 9.6 | 8.5 |
| Elongation at Break, (%) | 280 | 370 |
| Properties Measured at 70° C. | | |
| Modulus at 50% Elongation, (MPa) | 3.2 | 2.8 |
| Tensile Strength, (MPa) | 4.3 | 3.4 |
| Elongation at Break, (%) | 200 | 250 |

Laminate samples prepared as described above in Example 1 were placed in an oven heated to 70° C. The modulus at 50% elongation measured at 70° C. in the transverse direction was determined after the time shown in Table VIII.

TABLE VIII

| Modulus at 50% Elongation, (MPa) | |
|---|---|
| 0 Days | 2.8 |
| After 14 Days | 3.4 |
| After 30 Days | 3.4 |
| After 60 Days | 3.7 |
| After 90 Days | 3.7 |

EXAMPLE 4

An elastomer compound 4A was prepared using the procedure described in Example 1 and containing 100 parts Polymer Composition B, 140 parts carbon black, 30 parts paraffinic petroleum oil, 0.16 parts stearic acid, 3 parts zinc oxide, and 1 part elemental sulfur. The Mooney scorch at 150° C. was measured. The minimum was 40 and there was zero point rise in 30 minutes.

A second elastomer compound 4B was prepared in the same manner and contained 100 parts Polymer Composition B, 140 carbon black, 30 parts paraffinic petroleum oil, 0.17 parts stearic acid, 3 parts zinc oxide, 0.1 parts mercaptobenzothiazole and 1 part zinc dibutyldithiocarbamate. The Mooney scorch at 150° C. was measured. The minimum was 36 and there was a zero point rise in 30 minutes.

A two-layer laminate was produced using the procedure described in Example 1. The thickness of each layer was 0.57 mm.

Physical properties of the curable laminate were measured, according to ASTM D412 in both the machine and transverse directions. Results are shown in Table IX.

TABLE IX

| | Machine Direction | Transverse Direction |
| --- | --- | --- |
| Properties Measured at 23° C. | | |
| Modulus at 50% Elongation, (MPa) | 5.2 | 4.5 |
| Tensile Strength, (MPa) | 9.0 | 7.7 |
| Elongation at Break, (%) | 320 | 440 |
| Properties Measured at 70° C. | | |
| Modulus at 50% Elongation, (MPa) | 1.7 | 1.4 |
| Tensile Strength, (MPa) | 2.0 | 1.7 |
| Elongation at Break, (%) | 135 | 275 |

Laminate samples prepared as described above in Example 1 were placed in an oven heated to 70° C. The modulus at 50% elongation measured at 70° C. in the transverse direction was determined after the times shown in Table X.

TABLE X

| Modulus at 50% Elongation, (MPa) | |
| --- | --- |
| 0 Days | 1.4 |
| After 14 Days | 1.9 |
| After 30 Days | 1.9 |
| After 60 Days | 1.9 |

EXAMPLE 5

An elastomer compound 5A was prepared using the procedure described in Example 1 and containing 100 parts Polymer Composition C, 140 parts carbon black, 30 parts paraffinic petroleum oil, 0.16 parts stearic acid, 3 parts zinc oxide, and 1 part elemental sulfur. The Mooney scorch at 150° C. was measured. The minimum was 32 and there was a 10 point rise in 30 minutes.

A second elastomer compound 5B was prepared in the same manner as described above and contained 100 parts Polymer Composition C, 140 carbon black, 30 parts paraffinic petroleum oil, 0.17 parts stearic acid, 3 parts zinc oxide, 0.1 parts mercaptobenzothiazole and 1 part zinc dibutyldithiocarbamate. The Mooney scorch at 150° C. was measured. The minimum was 30 and there was a zero point rise in 30 minutes.

A two-layer laminate was produced using the procedure described in Example 1. The thickness of each layer was 0.57 mm.

Physical properties of the curable laminate were measured, according to ASTM D412 in both the machine and transverse directions. Results are shown in Table XI.

TABLE XI

| | Machine Direction | Transverse Direction |
| --- | --- | --- |
| Properties Measured at 23° C. | | |
| Modulus at 50% Elongation, (MPa) | 4.5 | 4.1 |
| Tensile Strength, (MPa) | 7.2 | 6.5 |
| Elongation at Break, (%) | 440 | 550 |
| Properties Measured at 70° C. | | |
| Modulus at 50% Elongation, (MPa) | 1.7 | 1.6 |
| Tensile Strength, (MPa) | 2.0 | 1.6 |
| Elongation at Break, (%) | 245 | 255 |

Laminate samples prepared as described above in Example 1 were placed in an oven heated to 70° C. The modulus at 50% elongation measured at 70° C. in the transverse direction was determined after the time shown in Table XII.

TABLE XII

| Modulus at 50% Elongation, (MPa) | |
| --- | --- |
| 0 Days | 1.6 |
| After 14 Days | 2.0 |
| After 30 Days | 2.1 |
| After 60 Days | 1.9 |

EXAMPLE 6

An elastomer compound 6A was prepared using the procedure described in Example 1 except that the compound was dumped from the mixer when the temperature reached 140°–150° C. The compound contained 100 parts Polymer Composition D, 140 parts carbon black, 30 parts paraffinic petroleum oil, 0.2 parts stearic acid, and 1 part elemental sulfur.

A second elastomer compound 6B was prepared in the same manner as described above and contained 100 parts Polymer Composition D, 140 carbon black, 30 parts paraffinic petroleum oil, 0.17 parts stearic acid, 1 part mercaptobenzothiazole and 1 part zinc dibutyldithiocarbamate.

A two-layer laminate was produced using the procedure described in Example 1 except that the calendar rolls were heated to 135°–145° C. The thickness of each layer was 0.57 mm.

Physical properties of the curable laminate were measured, according to ASTM D412 in both the machine and transverse directions. Results are shown in Table XII.

TABLE XII

| | Machine Direction | Transverse Direction |
| --- | --- | --- |
| Properties Measured at 23° C. | | |
| Modulus at 50% Elongation, (MPa) | 6.6 | 6.0 |
| Tensile Strength, (MPa) | 9.7 | 8.7 |
| Elongation at Break, (%) | 320 | 360 |
| Properties Measured at 70° C. | | |
| Modulus at 50% Elongation, (MPa) | 2.8 | 2.3 |
| Tensile Strength, (MPa) | 3.8 | 2.8 |
| Elongation at Break, (%) | 240 | 290 |

Laminate samples prepared as described above in Example 1 were placed in an oven heated to 70° C. The modulus at 50% elongation measured at 70° C. in the transverse direction was determined after the times shown in Table XIV.

TABLE XIV

| Modulus at 50% Elongation, (MPa) | |
|---|---|
| 0 Days | 2.3 |
| After 14 Days | 3.1 |
| After 30 Days | 3.5 |
| After 60 Days | 3.6 |
| After 90 Days | 3.5 |

EXAMPLE 7

An elastomer compound 7A was prepared using the procedure described in Example 1. The compound contained 100 parts Polymer Composition E, 150 parts carbon black, 40 parts haphthenic petroleum oil (Circosol 4240), 0.1 parts stearic acid, 3 parts zinc oxide, 1.6 parts elemental sulfur and 0.5 parts mercaptobenzothiazole. The Mooney scorch at 132° C. was measured. The minimum was 35 and there was a zero point rise in 20 minutes.

A second elastomer compound 7B was prepared in the same manner. The compound contained 100 parts Polymer Composition E, 150 parts carbon black, 40 parts naphthenic petroleum oil (Circosol 4240), 0.1 parts stearic acid, 3 parts zinc oxide, 0.5 parts mercaptobenzothiazole and 1 part zinc dibutyldithiocarbamate.

Laminate samples prepared as described above in Example 1 were placed in an oven heated to 70° C. The modulus at 50% elongation measured at 23° C. and at 70° C. in the transverse direction was determined after the times shown in the Table XV.

TABLE XV

| Modulus at 50% Elonqation, (MPa) | 23° C. | 70° C. |
|---|---|---|
| 0 Days | 2.8 | 0.9 |
| After 14 Days | 3.1 | 1.4 |
| After 28 Days | 3.1 | 1.5 |
| After 56 Days | 3.5 | 1.7 |
| After 112 Days | 3.7 | 1.8 |

I claim:

1. A curable laminated article, useful for roofing application, comprising at least two layers, each layer comprising a blend of (a) 50-80% by weight of an ethylene/propylene/nonconjugated diene elastomer and (b) 20-50% by weight of an ethylene-containing polymer selected from the group consisting of polyethylene, ethylene alpha-monoolefin copolymers wherein the monoolefin contains from 3-12 carbon atoms and is present in amounts of 2-8% by weight, and ethylene/vinyl acetate copolymers having vinyl acetate contents up to about 10% by weight, and wherein each alternate layer contains either elemental sulfur as the crosslinking agent for the elastomer or a cure accelerator so that the elastomer in the laminated article subsequently cures when elemental sulfur and the accelerator in each layer migrate to an adjacent layer when the laminate is exposed to elevated temperatures.

2. A laminated article of claim 1 wherein the ethylene/propylene/diene elastomer contains 50-75% by weight ethylene units.

3. A laminated article of claim 1 wherein the ethylene-containing polymer is polyethylene.

4. A laminated article of claim 1 wherein the ethylene-containing polymer is an ethylene/butene copolymer.

5. A laminated article of claim 1 wherein the ethylene-containing polymer is an ethylene/vinyl acetate copolymer.

6. A laminated article of claim 1 wherein the elastomer is an ethylene/propylene/1,4-hexadiene elastomer.

7. A laminated article of claim 1 wherein the elastomer is an ethylene/propylene/ethylidene norbornene elastomer.

8. A laminated article of claim 4 wherein the elastomer is an ethylene/propylene/norboradiene/diene tetrapolymer.

9. A laminated article of claim 8 wherein the elastomer contains 50-75% by weight ethylene units.

10. A laminated article of claim 1 wherein the accelerator is a salt of a dialkyldithiocarbamate.

11. A laminated article of claim 10 wherein the accelerator is zinc dibutyldithiocarbamate.

12. A laminated article of claim 10 wherein the dialkyldithiocarbamate is zinc dimethyldithiocarbamate.

13. A laminated article of claim 1 wherein zinc oxide is present in a layer.

14. A laminated article of claim 9 wherein the elastomer is an ethylene/propylene/1,4-hexadiene/norbornadiene tetrapolymer.

15. A laminated article of claim 2 wherein the ethylene-containing polymer is an ethylene/butene copolymer and wherein the accelerator is a salt of a dialkyldithiocarbamate.

16. A laminated article of claim 4 wherein the elastomer contains about 65-72% by weight ethylene units.

* * * * *